US008313660B1

(12) United States Patent
Tsotsis

(10) Patent No.: US 8,313,660 B1
(45) **Date of Patent: *Nov. 20, 2012**

(54) THERMOPLASTIC-BASED, CARBON NANOTUBE-ENHANCED, HIGH-CONDUCTIVITY LAYERED WIRE

(75) Inventor: Thomas K. Tsotsis, Orange, CA (US)

(73) Assignee: The Boeing Company, Chicago, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/975,551

(22) Filed: Dec. 22, 2010

Related U.S. Application Data

(63) Continuation of application No. 12/348,623, filed on Jan. 5, 2009, now Pat. No. 7,875,802.

(51) Int. Cl.
*B82Y 40/00* (2011.01)

(52) U.S. Cl. .......... 216/13; 427/117; 427/118; 427/122; 427/202; 427/203; 427/402; 427/407.1; 977/842; 977/888; 977/890

(58) Field of Classification Search ........................ None
See application file for complete search history.

(56) References Cited

U.S. PATENT DOCUMENTS

| | | | | |
|---|---|---|---|---|
| 6,988,925 | B2 | 1/2006 | Arthur et al. | |
| 7,118,693 | B2 | 10/2006 | Glatkowski et al. | |
| 7,378,040 | B2 | 5/2008 | Luo et al. | |
| 7,875,801 | B2 * | 1/2011 | Tsotsis | 174/126.1 |
| 7,875,802 | B2 * | 1/2011 | Tsotsis | 174/126.1 |
| 7,897,876 | B2 * | 3/2011 | Tsotsis et al. | 174/126.1 |
| 2008/0286560 | A1 | 11/2008 | Huang et al. | |
| 2009/0035469 | A1 | 2/2009 | Sue et al. | |
| 2009/0117303 | A1 * | 5/2009 | Goshiki | 428/36.9 |
| 2009/0321687 | A1 * | 12/2009 | Kim et al. | 252/507 |
| 2010/0170694 | A1 | 7/2010 | Tsotsis | |
| 2010/0170695 | A1 | 7/2010 | Tsotsis | |
| 2010/0288981 | A1 * | 11/2010 | Marcolongo et al. | 252/511 |
| 2011/0039064 | A1 * | 2/2011 | Wani et al. | 428/137 |
| 2011/0147673 | A1 * | 6/2011 | Gaillard et al. | 252/511 |

FOREIGN PATENT DOCUMENTS

| | | | |
|---|---|---|---|
| WO | 2005119772 | A2 | 12/2005 |
| WO | 2007024206 | A2 | 3/2007 |
| WO | 2008076473 | A2 | 6/2008 |

OTHER PUBLICATIONS

Palumbo, M. et al; Layer-by-Layer Thin Films of Carbon Nanotubes; Material Research Society; 2006; pp. 0901-Ra05-41-Rb05-41.1 to 0901-Ra05-41-Rb05-41.6; vol. 901E.
Loh, K. et al.; Multifunctional Layer-by-Layer Carbon Nanotube-Polyelectrolyte Thin Films for Strain and Corrosion Sensing; Smart Materials and Structures; 2007; pp. 429 to 439; vol. 16.
Sandler, J. et al.; Carbon-Nanofibre-filled Thermoplastic Composites; Materials Research Society; 2002; pp. 105 to 110; Vo. 706.
Zhao, Y. et al.; The Growth of Layer-by-Layer Aligned Carbon Nanotubes; IEEE; 2006; pp. 253 to 254.
Mamedov, A. et al.; Molecular Design of Strong Single-Wall Carbon Nanotube/Polyelectrolyte Multilayer Composites; Nature Materials; Nov. 2002; pp. 190 to 194; vol. 1; Nature Publishing Group.

* cited by examiner

*Primary Examiner* — Anita Alanko
(74) *Attorney, Agent, or Firm* — Armstrong Teasdale LLP

(57) ABSTRACT

A conductive wire includes a thermoplastic filament having a circumference and a plurality of coating layers dispersed about the circumference of the thermoplastic filament. The coating layers include a plurality of conductive layers comprising aligned carbon nanotubes dispersed therein and at least one thermoplastic layer between each pair of conductive layers.

8 Claims, 4 Drawing Sheets

THERMOPLASTIC-BASED, CARBON NANOTUBE-ENHANCED, HIGH-CONDUCTIVITY LAYERED WIRE

CROSS REFERENCE TO RELATED APPLICATIONS

This application is a continuation application of application Ser. No. 12/348,623 filed Jan. 5, 2009 now U.S. Pat. No. 7,875,802, which is hereby incorporated by reference in its entirety.

STATEMENT REGARDING FEDERALLY SPONSORED RESEARCH $ DEVELOPMENT

This invention was made with United States Government support under ATP/NIST Contract 70NANB7H7043 awarded by NIST. The United States Government has certain rights in the invention.

BACKGROUND

The field relates generally to fabrication of conductors, and more specifically to conductors that incorporate carbon nanotubes (CNTs) and the methods for fabricating such conductors.

Utilization of CNTs in conductors has been attempted. However, the incorporation of carbon nanotubes (CNTs) into polymers at high enough concentrations to achieve the desired conductivity typically increases viscosities of the compound containing the nanotubes to very high levels. The result of such a high viscosity is that the conductor fabrication process is difficult. A typical example of a high concentration is one percent, by weight, of CNTs mixed with a polymer.

Currently, there are no fully developed processes for fabricating wires based on carbon nanotubes, but co-extrusion of CNTs within thermoplastics is being contemplated, either by pre-mixing the CNTs into the thermoplastic or by coating thermoplastic particles with CNTs prior to extrusion. Application of CNTs to films has been shown, but not to wires.

Utilization of CNTs with thermosets has also been shown. However, thermosets are cross-linked and cannot be melted at an elevated temperature. Finally, previous methods for dispersion of CNTs onto films have not focused on metallic CNTs in order to maximize current-carrying capability or high conductivity.

The above mentioned proposed methods for fabricating wires that incorporate CNTs will encounter large viscosities, due to the large volume of CNTs compared to the overall volume of CNTs and the polymer into which the CNTs are dispersed. Another issue with such a method is insufficient alignment of the CNTs. Finally, the proposed methods will not produce the desired high concentration of CNTs.

BRIEF DESCRIPTION

In one aspect, a conductor wire is provided. The conductor includes a thermoplastic filament having a circumference and a plurality of coating layers dispersed about the circumference of the thermoplastic filament. The coating layers include a plurality of conductive layers comprising aligned carbon nanotubes dispersed therein and at least one thermoplastic layer between each pair of conductive layers.

In another aspect, a method for fabricating a conductive wire is provided. The method includes applying a magnetic field to a solution that includes carbon nanotubes dispersed therein, the magnetic field operating to align the carbon nanotubes, passing a thermoplastic filament through the solution, a portion of the solution adhering to the thermoplastic filament resulting in a coated filament, and washing the coated filament.

In still another aspect, a method for fabricating a conductor is provided. The method includes providing a thermoplastic filament, applying a layer of sulfonated thermoplastic to the filament, along an axial length thereof, applying a conductive layer to the thermoplastic layer, the conductive layer including carbon nanotubes dispersed therein, and alternatively repeating sulfonated thermoplastic application step and the conductive layer application step until the conductor possesses a desired conductivity.

DETAILED DESCRIPTION

The described embodiments seek to overcome the limitations of the prior art by placing high volume fractions of carbon nanotubes (CNTs) onto the surface of a lightweight substrate to produce high-conductivity wires. One embodiment uses a continuous process and avoids the processing difficulties associated with dispersion of CNTs within the polymer before the structure is fabricated.

Figure 1:
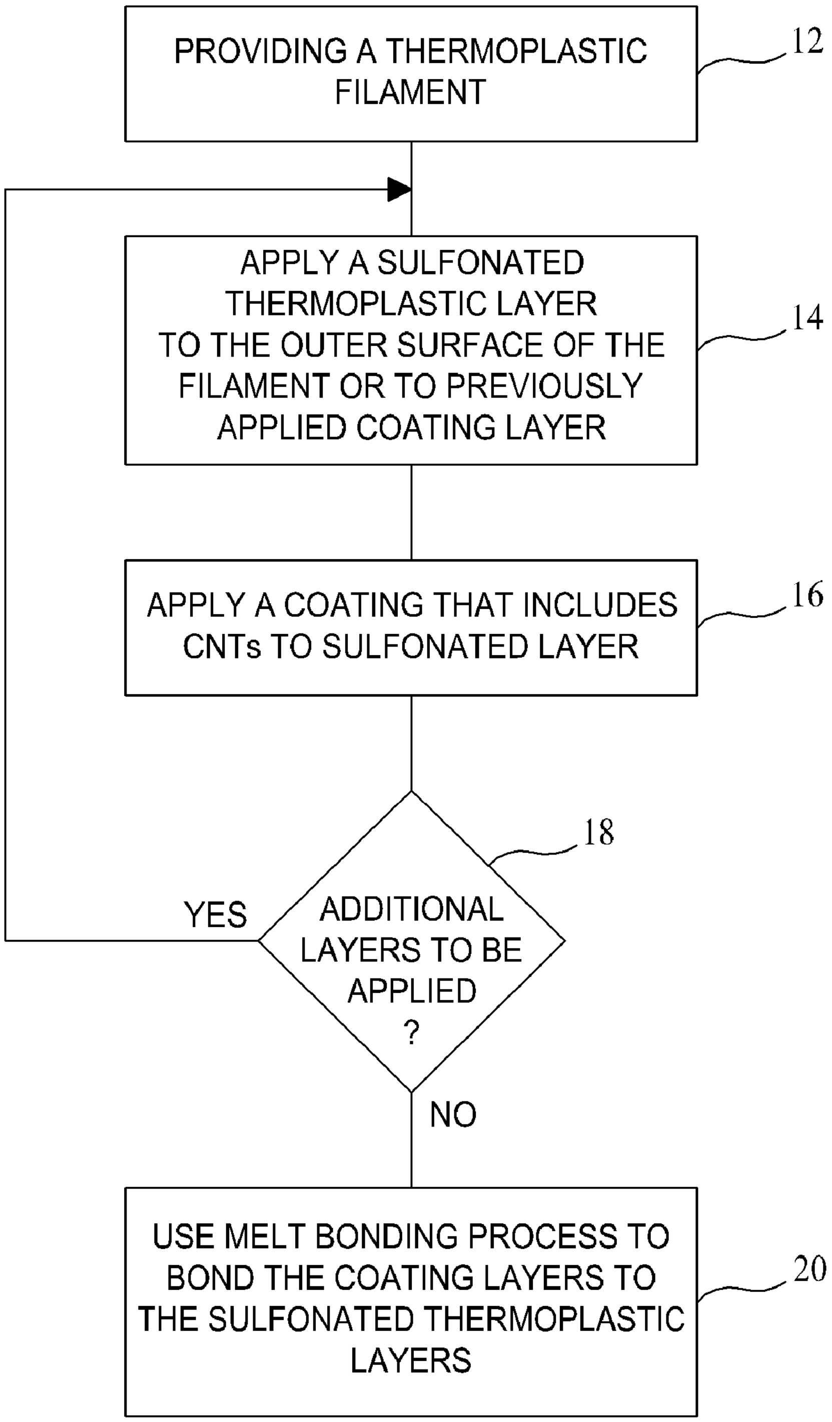
FIG. 1 is a flowchart illustrating a conductor fabrication process that incorporates carbon nanotubes.

One embodiment, illustrated by the flowchart 10 of FIG. 1, includes a method for producing high-conductivity electrical wires based on layer-by-layer coating methodologies and metallic carbon nanotubes (CNTs) to introduce sufficiently high concentrations of CNTs into polymeric materials resulting in a high-conductivity conductor. The focus is on high conductivity combined with high flexibility for electrical conductors instead of focus on high stiffness, high strength, or modest increases in conductivity as were prior layer-by-layer applications.

Now referring to the flowchart 10, a thermoplastic filament, sometimes referred to herein as a substrate, is provided 12. In one embodiment, a sulfonated thermoplastic layer is applied 14 to the outer surface of the thermoplastic filament. A coating, including CNTs, is then applied 16 to the sulfonated thermoplastic layer. Several alternating layers of sulfonated thermoplastic and the coating may be applied 18 to the thermoplastic filament. The assembly is then melt-processed 20 to form CNT-enhanced, high-conductivity thermoplastic conductor. The melt-processing 20 step bonds the coating to the individual thermoplastic layers. After the melt bonding process, an outer coating, such as wire insulation, can be applied to the layered assembly.

The process illustrated by the flowchart 10 allows for high volume fractions of aligned carbon nanotubes to be applied to the surface of a thermoplastic to produce high-conductivity wires using a layer-by-layer process. Such a process avoids the necessity for having to mix nanoparticles and/or nanotubes into a matrix resin, since the combination of the two may result in a compound having an unacceptably high viscosity. Continuing, the high viscosity may make processing of the resulting compound difficult.

Figure 2:
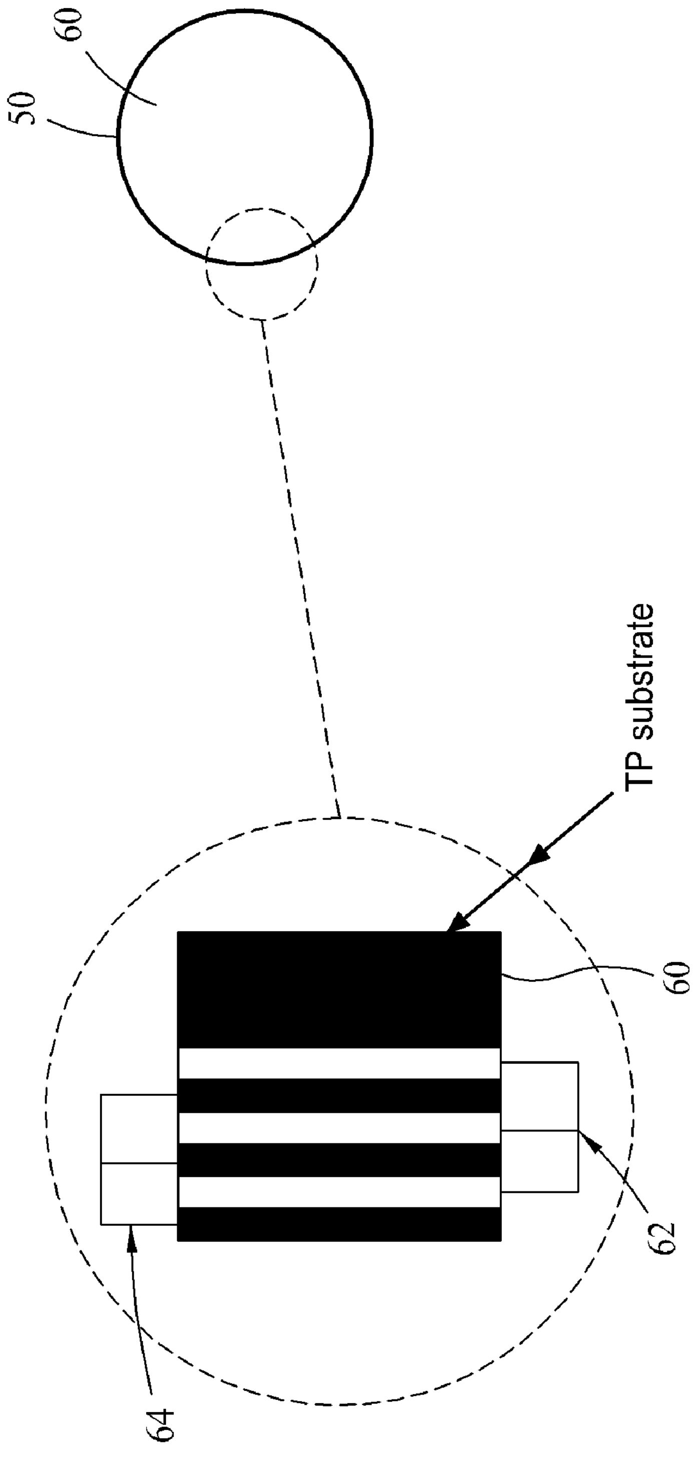
FIG. 2 is a cross-sectional diagram further illustrating a conductor 50 fabricated utilizing the process of FIG. 1.

FIG. 2 includes a cross-sectional diagram further illustrating a conductor 50 fabricated utilizing the process of FIG. 1. As shown in the cross section of conductor 50, the thermoplastic filament 60, or substrate, has a plurality of alternating sulfonated thermoplastic layers 62 and layers 64 that include CNTs therein. The layers 62 and 64 are placed around the circumference of thermoplastic filament 60. In some embodiments, a portion of each individual layer 62 and/or 64 is exposed along an axial length of thermoplastic filament 60. In such embodiments, layer 62 and/or 64 may be utilized to separate individual layers of the coating material, and a portion of each individual layer 62 and/or 64 may be removed. In one specific embodiment, the layers 64 that include the CNTs are processed to include only single-walled nanotubes. While filament 60 is illustrated as being circular in cross-section, the embodiments described herein are operable with any cross-sectional configuration for the filament.

Figure 3:
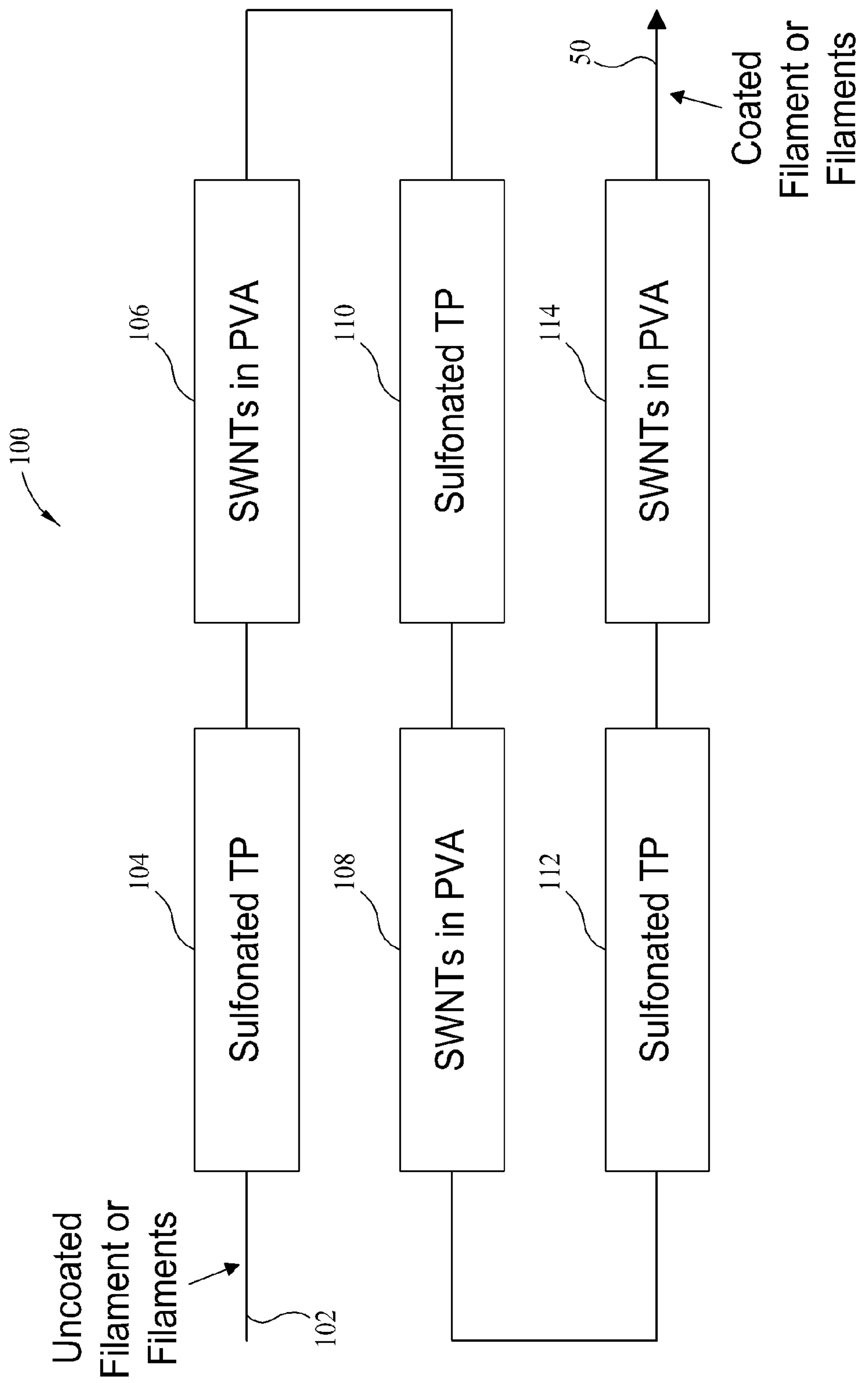
FIG. 3 is a flow diagram illustrating application of alternating layers of thermoplastics and carbon nanotubes to fabricate the conductor illustrated in FIG. 2

The illustrated embodiment shown in FIG. 2 includes three thermoplastic layers 62 alternating with three CNT embedded layers 64. FIG. 3 is a flow diagram 100 the further illustrates the process for fabricating a conductor with the three alternating layers 62, 64. It should be noted that the three-layer configuration is but one example of a conductor, and that fewer or additional alternating layers could be utilized depending on, for example, expense and desired conductivity. Now referring specifically to FIG. 3, one or more uncoated filaments 102 are coated 104 with a sulfonated thermoplastic in preparation for application of the CNTs. The CNTs are applied 106, for example, by passing the thermoplastic coated filaments through a polyvinyl alcohol solution which includes the CNTs. To build up the conductor to the three-layer embodiment, the filaments 102 are alternatively coated 108, 112 with the sulfonated thermoplastic and CNTs are applied 110, 114 resulting in the conductor 50 illustrated in FIG. 2.

Figure 4:
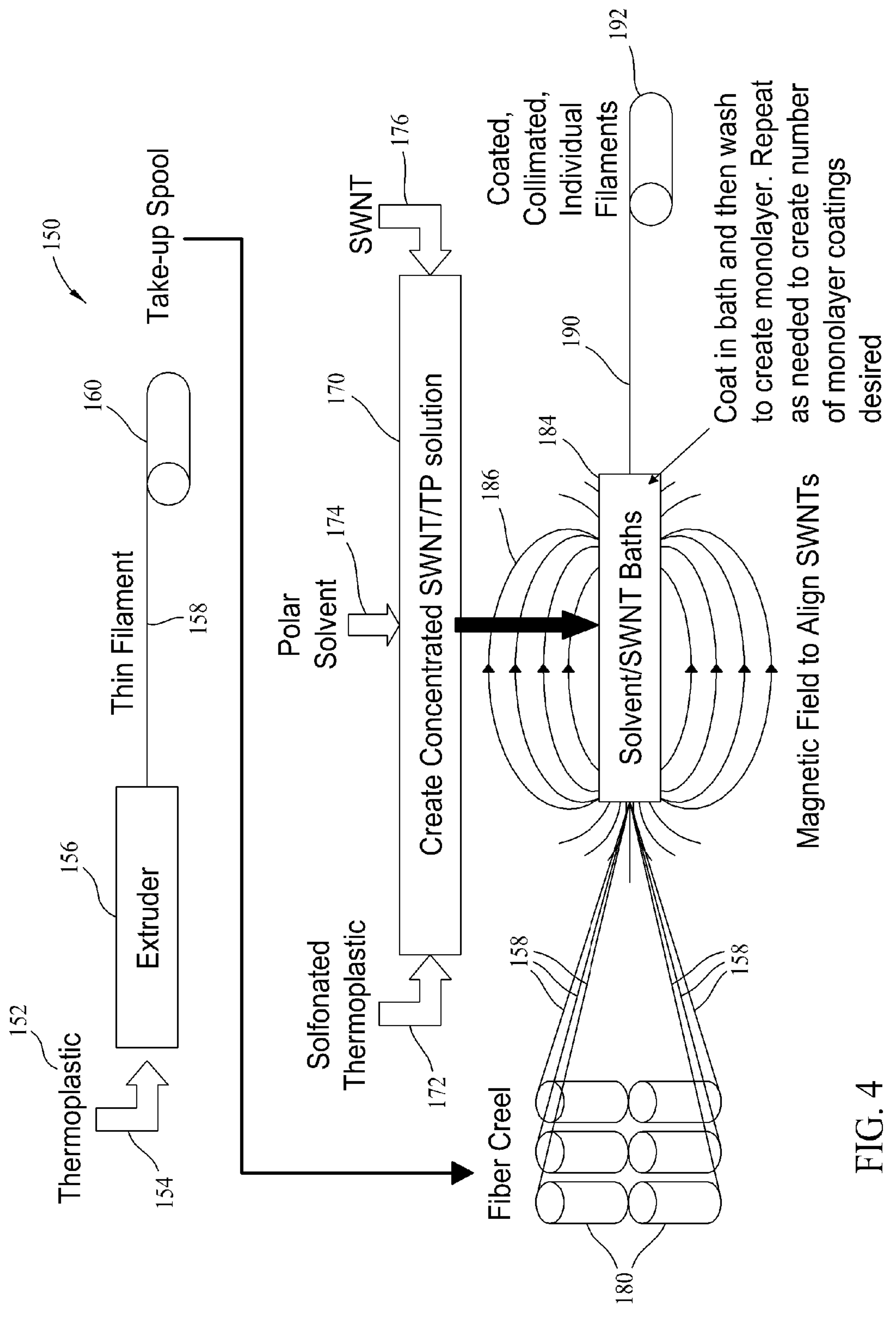
FIG. 4 is a block diagram that illustrates the individual components and processes utilized in fabricating a carbon nanotube-based conductor.

FIG. 4 is a block diagram 150 that illustrates the individual components utilized in fabricating a carbon nanotube-based conductor. As mentioned herein, coating methodologies are utilized to introduce sufficiently high concentrations of CNTs into polymeric materials for high-conductivity wire which are applied using a layer-by-layer coating method, as opposed to previously disclosed methods that disclose the mixing of CNTs into a resin. It is believed the currently disclosed solutions are preferable because no current solution exists for making CNT-based wires, though some methods have been proposed, as described above.

Now referring specifically to FIG. 4, fabrication of the thermoplastic filaments is described. A thermoplastic material 152 is input 154 into an extruder 156 configured to output a thin filament 158 of the thermoplastic material which is gathered, for example, onto a take up spool 160.

In a separate process, a concentrated solution 170 is created that includes, at least in one embodiment, thermoplastic material 172, a solvent 174, and carbon nanotubes (CNTs) 176. The solution 170, in at least one embodiment, is an appropriate solution of CNTs 176, solvent 174, and may include other materials such as surfactants suitable for adhering to the outer surface of thermoplastic filaments. In one embodiment, the solution 170 includes one or more chemicals that de-rope, or de-bundle, the nanotubes, thereby separating single-walled nanotubes from other nantubes. The solution 170 is further suitable for coating thin, flexible filaments with multiple monolayers of CNTs, for example in a configuration as illustrated by FIG. 2, to achieve a desired concentration. In one embodiment, the solution 170 is a portion of the fabrication that is set up for continuous dipping, washing, and drying of individual CNT layers as they are applied to the filament.

Continuing, to fabricate the above described conductor, one or more separate creels 180 of individual thermoplastic filaments 158 are passed through a bath 184 of the above described solution 170. As the filaments 158 pass through the bath 184, a magnetic field 186 is applied to the solution 170 therein in order to align the carbon nanotubes 176. In a specific embodiment, which is illustrated, the CNTs 176 that are to be attached to the filaments 158 are the single-walled nanotubes.

The magnetic field 186 operates to provide, at least as close as possible, individual carbon nanotubes for layered attachment to the filaments 158. The magnetic field 186 operates to separate the de-bundled CNTs into different types and works to extract metallic CNTs that have an “armchair” configuration, which refers to the CNT having a hexagonal crystalline carbon structure aligned along the length of the CNT. Such CNTs have the highest conductivity.

The embodiments represented in FIG. 4 all relate to a continuous line suitable for coating thin, flexible, polymeric strands (filaments 152) with a layer of the CNT solution 170 at a sufficient thickness to achieve a desired concentration or conductivity. The magnetic field 186, which may be the result of an electric field, is utilized to align the CNTs 176 in the solution 170 into the same direction as the processing represented in the Figure.

In one embodiment, the filaments 158 emerge from the solution 170 as coated strands 190 which are then washed and subsequently gathered onto spools 192 for post-processing. As shown in FIG. 4, the coated strands 190 may be subjected to a repeatable process. For example, to fabricate the multiple conductive layers as shown in FIG. 2, the filaments 158 are passed through the solution 170 and subsequently washed as many times as needed to create the number of monolayers of CNTs to create, for example, the desired conductivity. Finally, though not shown in FIG. 4, a suitable, flexible outer coating may be applied to the coated strands 190 and subsequently packaged in a fashion similar to that used for metallic wire.

The described embodiments do not rely on dispersing CNTs into a resin as described by the prior art. Instead, layers of CNTs are placed about the circumference of small-diameter thermoplastic filaments as described above. One specific embodiment utilizes only high-conductivity, single-walled, metallic CNTs to maximize electrical performance. Such an embodiment relies on very pure solutions of specific CNTs instead of mixtures of several types to ensure improved electrical performance. The concentrations levels of CNTs to coating are optimized for conductivity, in all embodiments, as opposed to concentrations that might be utilized with, or dispersed on, films, sheets and other substrates.

This written description uses examples to disclose certain embodiments, including the best mode, and also to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fabricating an electrical circuit using a conductor, said method comprising:

exposing a portion of each individual layer of a coating material dispersed about the circumference of a thermoplastic filament, along an axial length thereof, each individual layer of the coating material including carbon nanotubes dispersed therein, the individual layers separated by a thermoplastic layer; and utilizing the carbon nanotubes within the layers of the coating material to conduct a current.

2. The method according to claim 1 wherein exposing a portion of each individual layer of a coating material comprises removing a portion of the thermoplastic layers utilized to separate individual layers of the coating material.

3. The method according to claim 1 wherein exposing a portion of each individual layer of a coating material comprises exposing a portion of the coating material for a bundled plurality of thermoplastic filaments each individually coated with the layers of coating material.

4. The method according to claim 1 wherein exposing a portion of each individual layer of a coating material comprises exposing a portion of the carbon nanotubes dispersed within each layer of the coating material.

5. The method according to claim 1 wherein exposing a portion of each individual layer of a coating material comprises exposing at least some of the carbon nanotubes dispersed within each layer of the coating material.

6. The method according to claim 5 wherein exposing a portion of the axially aligned carbon nanotubes disposed within each layer of the coating material comprises exposing a portion of the carbon nanotubes within each layer of coating material that have a hexagonal crystalline carbon structure and are axially aligned along the length of the at least one thermoplastic filament.

7. The method according to claim 1 wherein exposing a portion of each individual layer of a coating material comprises removing an insulative coating.

8. The method according to claim 1 wherein exposing a portion of a coating material comprises exposing the portion of the coating material, the coating material of a sufficient thickness to achieve a desired concentration of carbon nanotubes therein.

* * * * *